Jan. 12, 1926. 1,569,466
J. L. DRAKE
SHEET GLASS ROLLING APPARATUS
Filed April 30, 1925 2 Sheets-Sheet 1
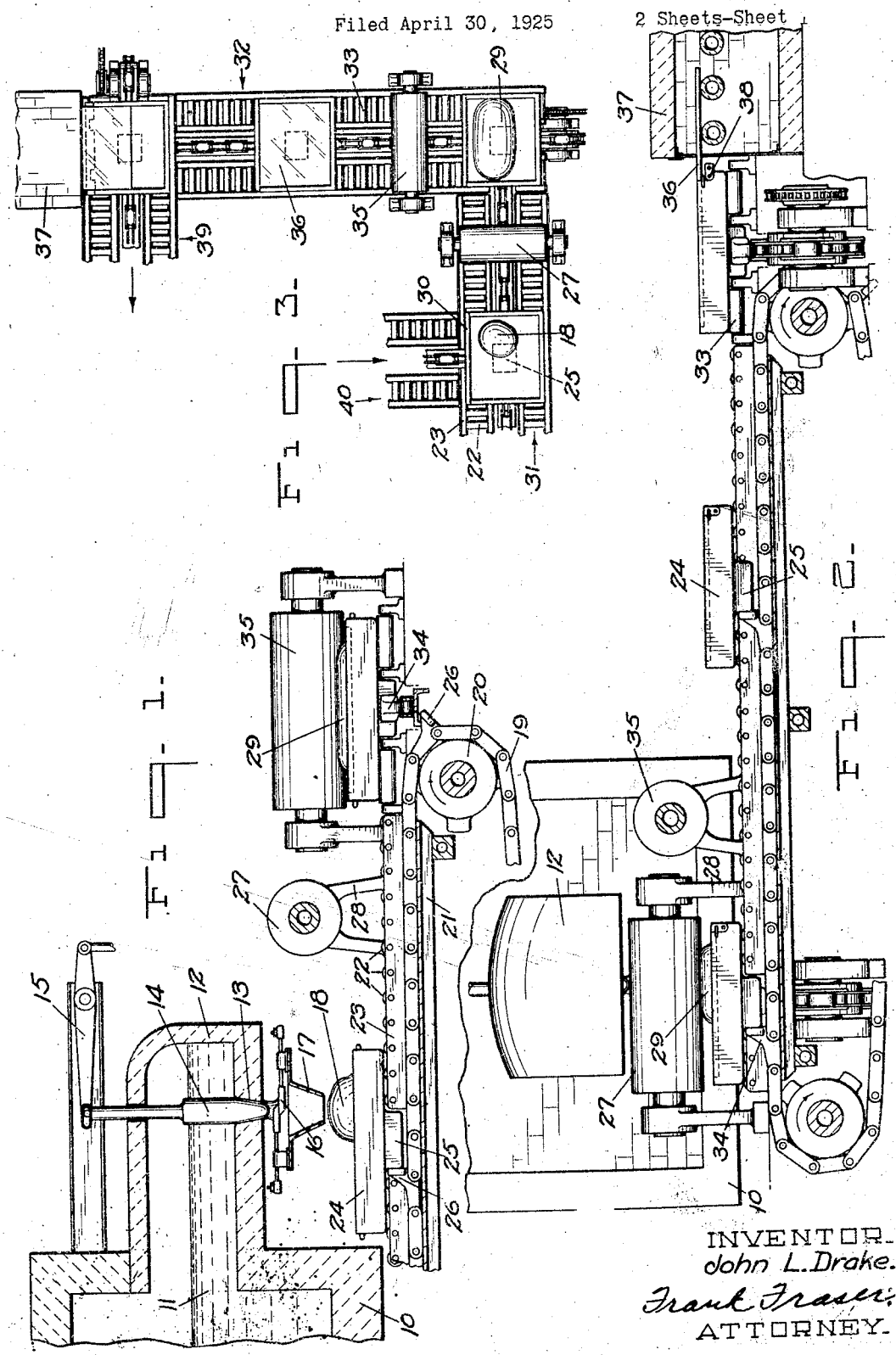
INVENTOR.
John L. Drake.
Frank Fraser
ATTORNEY.

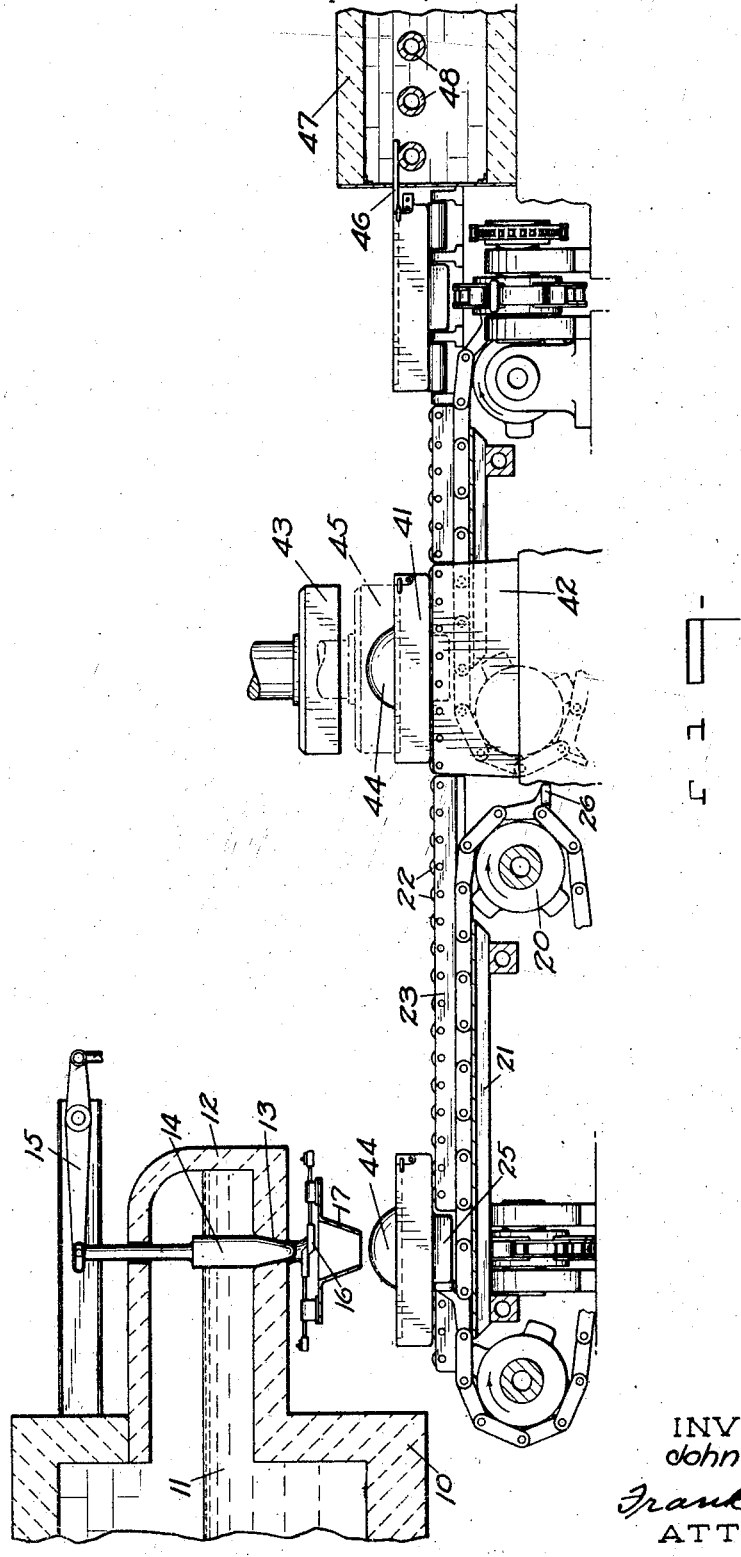

Patented Jan. 12, 1926.

1,569,466

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-ROLLING APPARATUS.

Application filed April 30, 1925. Serial No. 26,945.

*To all whom it may concern:*

Be it known that I, JOHN L. DRAKE, a citizen of the United States, residing at Toledo, in the county of Lucas and State of Ohio, have invented new and useful Improvements in Sheet-Glass-Rolling Apparatus, of which the following is a specification.

The present invention relates to sheet glass apparatus, and has reference to the production of sheets of glass particularly well-adapted for use as plate glass blanks.

An important object of the invention is to provide an apparatus for producing blanks of glass suitable for plate glass manufacture, the said apparatus being capable of rapidly producing said blanks.

Another object is to provide mechanism for creating gobs or charges of glass of a predetermined size, the gobs of glass being adapted to be reduced through several stages to sheet form, the said sheets having predetermined dimensions and being capable for use as plate glass blanks.

Still another object of the invention is to provide a gob feeding mechanism for discharging a predetermined quantity of glass upon a movable support which is adapted to be moved under a rotatable member to roll the gob to the desired length after which the gob is moved in transverse direction beneath a second member to roll it to the desired width.

Still another object of the invention is to provide a method and apparatus for producing sheets of glass wherein gobs or charges of glass are discharged from a suitable container in succession, each of said gobs being supported upon a movable table which is moved beneath a plurality of rotatable stationary rolls, to reduce the gob to sheet form of predetermined dimensions.

Other objects and advantages of the invention will become apparent during the following description.

In the drawings wherein like numerals are employed to designate like parts throughout the same, Fig. 1 is a fragmentary elevation partially in section, showing the device in operation.

Fig. 2 is an end elevation thereof,

Fig. 3 is a fragmentary plan view of the gob reducing mechanism, and

Fig. 4 is a side elevation of a slightly modified form of construction.

Heretofore plate glass blanks have been produced by rolling a large quantity of molten glass upon a suitable table. The glass is ordinarily in this process removed from a tank in a large ladle, after which it is poured upon the table as has been stated. Considerable heat is dissipated in the transfer of the glass from the tank to the rolling table. Due to the loss of heat exceptional speed and skill is required to roll the mass of glass to sheet form before it has set up to a point where it is not workable. Blanks formed in this process are inherently irregular and rough so that it is necessary to allow ample thickness of glass to permit removal of the uneven portions during the grinding and polishing operations to give an absolutely flat uniform sheet. This greatly increases the cost of so-called plate glass as the surfacing operations which usually include grinding and polishing are slow and expensive. The term plate glass is used in the art to designate glass which has been surfaced by means of grinding and polishing.

It is an aim of the present invention to produce a method and apparatus for quickly and easily forming blanks of glass which are relatively flat and uniform in thickness, whereby the thickness of the blank can be relatively much thinner than the blanks heretofore used. By reason of the flatness of the blank, allowance is made for the surfacing operations, but it is not necessary to make such an enormous allowance as heretofore.

In the drawings is shown a form of gob feeder which is merely diagrammatic and which is used to discharge a predetermined charge or gob of glass from a suitable container. Each charge of glass is received upon one of a plurality of molds or tables which are then moved beneath a plurality of preferably stationary rotatable members. The clearance beneath each roll is successively less so that the gob is gradually reduced to the proper dimensions. The gob is preferably rolled in one direction first to produce the desired length of blank, after which it is rolled in the opposite direction to give the desired width. The resulting blank will have a predetermined thickness, as well as length and breadth. The size of the blanks produced will depend upon the size of gob and size of mold used.

which can be changed as desired very easily.

The numeral 10 designates a tank furnace containing a mass of molten glass 11 which is permitted to flow in the discharge end 12. The bottom of the discharge end 12 is provided with a suitable opening 13 in which is adapted to reciprocate a plunger 14 operable through means of the cross-arm 15. The plunger 14 may be of any construction, and if it is desired it may be rotated to prevent the glass from sticking thereto. Arranged below the outlet 13 are a pair of cutter knives 16 which are provided to cut the charge of glass as will be understood. A guide trough 17 may be used to direct the gob or charge 18 which has been released from the machine.

Arranged below the guide trough 17 is an endless chain mechanism 19 movable about the sprocket drums 20 and dragging across the guide rails 21 in its upper horizontal run. Arranged on both sides of the chain 19 are a plurality of bearing members 22 supported in the rails 23. Mold sections 24 are adapted to ride along the ways formed by the rolls 22. Each of said molds are provided with the downwardly extending projections 25 against which lugs 26 are adapted to abut. Arranged at intervals in the chain construction 19 are the lugs 26, and as is clearly shown in Fig. 1 the lug 26 will engage one of the surfaces of the projection 25 whereby to move the mold sections 24 along the rolls 22.

After the gob or charge of glass 18 has been deposited, preferably in the front end of the mold section 24, the lug 26 abutting against the projection 25 will cause the mold to be moved under a rotatable drum or roll 27 carried in the stationary supports 28. As is shown in Fig. 3 the roll 27 will roll the gob approximately into a shape as designated by the numeral 29. The table 24 is provided with flange portions 30 to restrict the movement of the gob 18. As is indicated by the numeral 29 the gob has been rolled to its desired length. The mold section is then transferred from the carrier mechanism 31 to the carrier mechanism 32 which is accomplished by permitting the mold to ride over upon the rolls 33 corresponding to the rolls 22. The mold is then engaged by the lug 34 in Fig. 1 corresponding to the lugs 26 which causes the mold to be moved in a direction transverse to its first direction. It is then passed beneath a second roll 35 similar to the roll 27 but arranged closer to the mold than the original, thus rolling the gob to the desired width and the final thickness, thus the thickness of sheet produced depends upon the closeness of the second roll 35 to the mold. The blank produced is indicated by the numeral 36. Obviously, any number of finishing or supplementary rolls can be added to the construction to insure a perfectly flat and uniform thickness of sheet. After the gob has been reduced to sheet form it is permitted to leave its mold and pass into an annealing leer 37. The mold is provided with the movable end or gate 38 which is lowered when it is desired to remove the sheet from the mold or table. The table is then run around on carriages 39 and 40, placing it in position beneath the gob feeding mechanism ready to receive another gob. Any number of mold sections can be used depending upon the thickness of sheet, size of sheet and rapidity with which the gobs are discharged from the tanks.

In Fig. 4 a slightly modified form of construction is shown wherein the mold section 41 instead of passing beneath a plurality of rolls to reduce the gob to thickness is run over a block 42 arranged beneath a plunger member 43. When the mold 41 supporting the gob 44 is upon the base 42 the plunger is lowered as indicated by the dotted lines 45 to reduce the gob to sheet form, after which the mold is moved along so that the sheet 46 can be removed and passed through the annealing leer 47 being supported upon the leer rolls 48. The same form of tracking mechanism can be used to make the movement of the mold sections automatic and continuous.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a tank containing a mass of molten glass, means to discharge a gob of glass therefrom, and means to reduce the gob to sheet form by rolling it along different axes.

2. In sheet glass apparatus, a tank containing a mass of molten glass, means to discharge a gob of glass therefrom, and means for rolling it a number of times to reduce it to sheet form.

3. In sheet glass apparatus, a tank containing a mass of molten glass, means to discharge a gob of glass therefrom, means for rolling the gob in one direction, and means to roll the gob again in a direction transverse to the first.

4. In sheet glass apparatus, a tank containing a mass of molten glass, means to discharge a gob of glass therefrom, and means for reducing a gob to sheet form consisting of means to roll the gob to length, and means to roll it to width.

5. In sheet glass apparatus, a tank containing a mass of molten glass, means to discharge a gob of glass therefrom, and means for moving the gob beneath a plurality of rolls to reduce it to sheet form.

6. In sheet glass apparatus, a tank containing a mass of molten glass, means for discharging gobs in succession therefrom, means for supporting each gob, a plurality of rolls, and means for moving each gob beneath the said rolls to reduce it to sheet form.

7. In sheet glass apparatus, a tank containing a mass of molten glass, means for discharging gobs in succession therefrom, means for reducing the gobs to sheet form whereby each gob is rolled in one direction to reduce it to length, and means for rolling it in another direction to reduce it to width.

8. In sheet glass apparatus, a tank containing a mass of molten glass, means to discharge a gob of glass therefrom, and means for rolling the gob along intersecting axes to reduce it to sheet form.

9. In sheet glass apparatus, a tank containing a mass of molten glass, means for discharging successive gobs of glass therefrom, means for supporting each gob, a plurality of rolls, and means to move each gob beneath the rolls to reduce it to sheet form, said rolls being arranged to permit the gob to be rolled along intersecting axes.

10. In sheet glass apparatus, a tank containing a mass of molten glass, means for discharging successive gobs of glass therefrom, means for rolling the gob along one of its axes to give the desired length, and means for rolling the gob along an intersecting axis to give the desired width.

11. In sheet glass apparatus, a tank containing a mass of molten glass, means for discharging successive gobs of glass therefrom, means for rolling the gob along one of its axes to give the desired length, and means for rolling the gob along an intersecting axis to give the desired width and thickness of sheet.

12. In sheet glass apparatus, a tank containing a mass of molten glass, means for discharging successive gobs of glass therefrom, means for moving the gob beneath a roll and a second roll mounted relatively closer to the lower surface of the gob than the first, said gob being adapted to move therebeneath to be reduced to the desired thickness.

13. In sheet glass apparatus, a tank containing a mass of molten glass, means for discharging successive gobs of glass therefrom, a plurality of rolls arranged at various relative heights, and means for moving the gobs beneath the rolls to reduce them to sheet form.

14. In sheet glass apparatus, a tank containing a mass of molten glass, means for discharging successive gobs of glass therefrom, a plurality of rolls arranged at various relative heights, and means for moving the gobs beneath the rolls to reduce them to sheet form, the rolls being mounted in positions whereby each gob is rolled along different axes.

15. In sheet glass apparatus, a tank containing a mass of molten glass, means for discharging successive gobs of glass therefrom, a plurality of rolls arranged at various relative heights, and means for moving the gobs beneath the rolls to reduce them to sheet form, the rolls being mounted in positions whereby each gob is rolled along different and intersecting axes.

16. In sheet glass apparatus, a tank containing a mass of molten glass, means for discharging successive gobs of glass therefrom, a plurality of rolls arranged at various relative heights, and means for moving the gobs beneath the rolls to reduce them to sheet form, the said rolls being mounted in positions whereby each gob is rolled along one axis to give the desired length and then rolled along an intersecting axis to give the desired width.

17. In sheet glass apparatus, a tank containing a mass of molten glass, means for discharging successive gobs of glass therefrom, a plurality of rolls arranged at various relative heights, and means for moving the gobs beneath the rolls to reduce them to sheet form, the said rolls being mounted in positions whereby each gob is rolled along its longitudinal axis to give it the desired length, after which it is rolled along an axis transverse to the first to give the gob the desired width and thickness.

18. The process of producing sheet glass, consisting in creating a gob of glass and then rolling it along different axes to reduce it to sheet form.

19. The process of producing sheet glass, consisting in creating a gob of glass and then rolling it along intersecting axes to reduce it to sheet form.

20. The process of producing sheet glass, consisting in creating a gob of glass and then rolling it along one axis to give the desired length to the gob, and then rolling it along another axis to give it the desired width.

21. The process of producing sheet glass, consisting in creating a gob of glass and then moving the gob beneath a plurality of members arranged at different relative heights to reduce it to sheet form.

Signed at Toledo, in the county of Lucas, and State of Ohio, this 28th day of April, 1925.

JOHN L. DRAKE.